United States Patent [19]
Newkirk et al.

[11] Patent Number: 4,925,519
[45] Date of Patent: May 15, 1990

[54] COLLAPSIBLE CONTACT HEATING PLATEN

[75] Inventors: Raymond K. Newkirk, Plymouth; William G. West, Edina, both of Minn.

[73] Assignee: Forward Technology Industries, Inc., Minneapolis, Minn.

[21] Appl. No.: 276,887

[22] Filed: Nov. 28, 1988

[51] Int. Cl.$^5$ ............................................. B29C 65/20
[52] U.S. Cl. .............................. 156/304.1; 156/304.6; 156/499; 156/507
[58] Field of Search ............... 156/304.1, 304.2, 304.6, 156/499, 507, 583.1

[56] References Cited

U.S. PATENT DOCUMENTS

| | | | |
|---|---|---|---|
| 3,879,254 | 4/1975 | Hay, II | 156/499 |
| 3,897,296 | 7/1975 | Waldrum | 156/304.6 |

Primary Examiner—Michael Wityshyn
Attorney, Agent, or Firm—Haugen and Nikolai

[57] ABSTRACT

A contact heating platen assembly includes an upright central standard, a plurality of inclined linking members pivotally mounted to the standard, and to a pair of opposed platen carriers on opposite sides of the standard, each traversing an arcuate path relative to the standard. Each of the carriers supports a heating platen and an electrical heating element for heating the platen. The carriers are spring biased into a collapsed position against the standard, but movable to an extended position relatively remote from the standard. To complete a fusion bond, a pair of workpieces are positioned on opposite sides of the platen assembly, each with a fusible surface portion positioned to be engaged by one of the platens when the assembly is extended. The assembly is extended whereby the heated platens engage the fusible surface portions. The platens are maintained against the surface portions until they are fused, then allowed to retract or collapse under the spring force. The assembly is then withdrawn from between the workpieces and the workpieces are moved into engagement with one another to complete the bond.

11 Claims, 2 Drawing Sheets

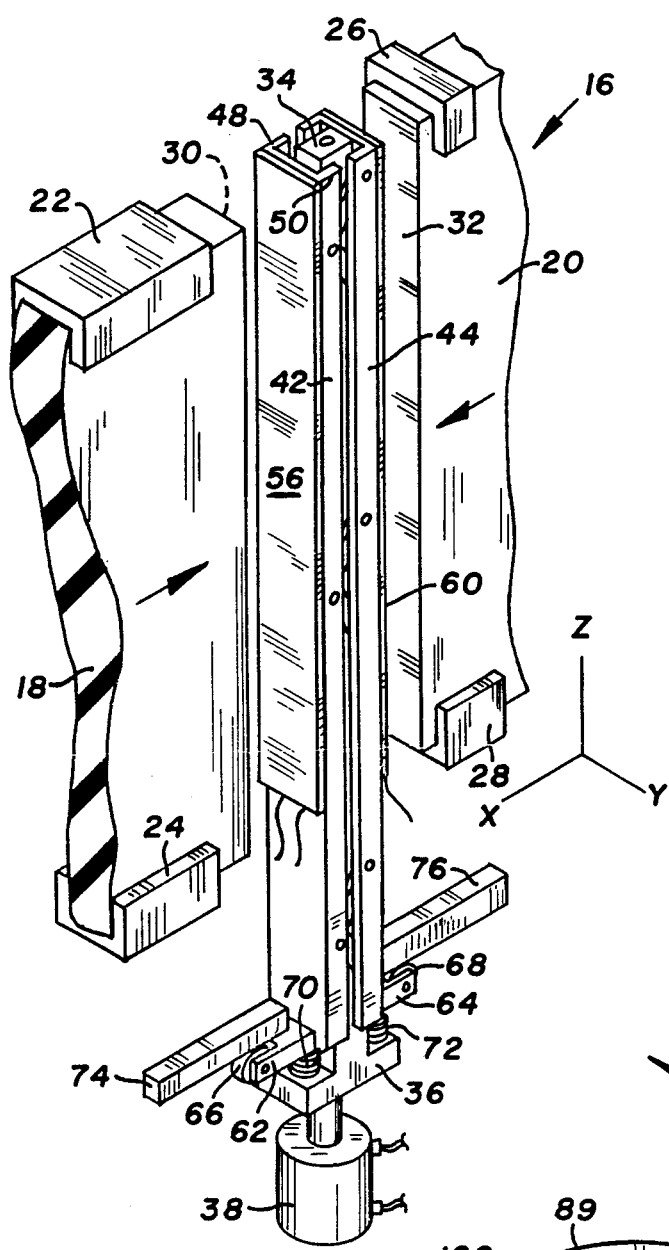
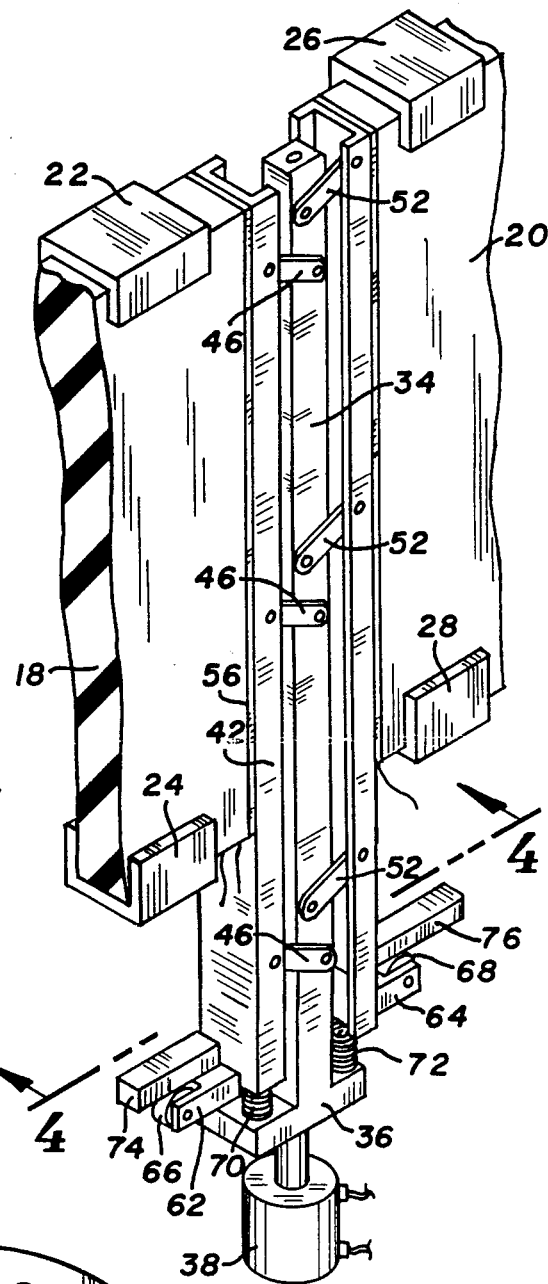
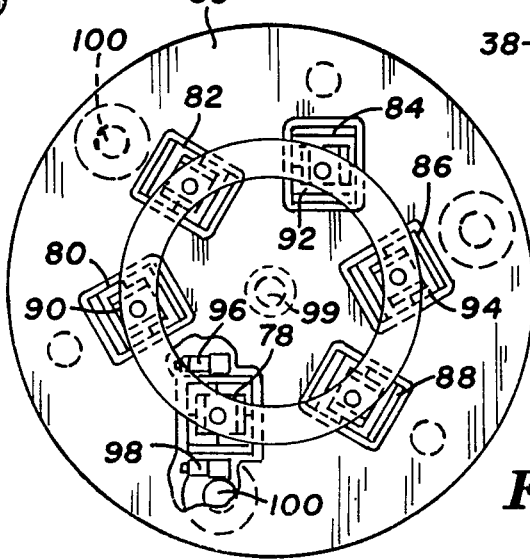
*FIG.1*     *FIG.2*     *FIG.3*

COLLAPSIBLE CONTACT HEATING PLATEN

BACKGROUND OF THE INVENTION

This invention relates to the fusion bonding of thermoplastic articles, and more particularly to an assembly including opposed heating platens extensible to contact and heat a pair of stationary juxtaposed articles immediately prior to their fusion bonding.

Fusion bonding using heated platens is a well known and widely utilized technique for forming strong bonds between parts constructed of fusible plastic. Generally, articles to be bonded are positioned in spaced apart relation to one another with their fusible surface portions aligned and facing one another. A heating platen is interposed between the articles, and the articles are moved against the platen in order to form a fused or plasticized layer in each of the articles. Immediately after heating, the articles are retracted slightly and the platen is withdrawn, whereupon the articles are brought together under pressure, then allowed to cool to complete the fusion bond.

Generally, this process can yield highly satisfactory fusion bonds. Difficulties are encountered, however, where the thermoplastic articles to be bonded are large or bulky, where dimensional tolerances are strict, and where time is at a premium. For example, larger thermoplastic articles require larger fixtures for their support and positioning, increasing the difficulty in meeting strict tolerances for positioning and dimensions. Further, the inertia of larger articles and fixtures increases the difficulty of the rapid or nearly instantaneous reciprocal motion necessary for optimizing certain bonding operations. Consequently, the conventional fusion bonding process, when used to join large, heavy or bulky articles, calls for a compromise between various desirable features such as stability, minimum time and dimensional accuracy.

Therefore, it is an object of the present invention to provide an apparatus particularly well suited for accurate positioning of thermoplastic articles just prior to their fusion bonding, and for rapidly establishing and terminating heating platen contact with such articles.

Another object of the invention is to provide a means for precisely controlling the relative motion of a contact heating platen means and fusible articles as they are heated prior to fusion bonding.

Yet another object is to provide a fusion bonding process for bulky articles which simplifies the pattern of movement of the articles, resulting in a more repeatable, predictable fusion bond.

Yet another object of the invention is to reduce the time required for manipulating heating platens used in the fusion bonding of certain thermoplastic articles.

SUMMARY OF THE INVENTION

To achieve these and other objects, there is provided an apparatus for forming a fusion bond between a pair of thermoplastic articles. The apparatus includes a contact heating platen assembly with a longitudinally extended central member, first and second contact heating platens on opposite sides of the central member, and a platen mounting means for supporting the first and second platens in a longitudinal orientation and for synchronized reciprocal movement between a retracted position in which the first and second platens are proximate the central member, and an extended position in which the first and second platens are relatively remote from the central member. The apparatus further includes a fixture means for supporting a pair of thermoplastic articles on opposite sides of the heating platen assembly. A fusible surface portion of each of the thermoplastic articles faces an associated one of the contact heating platens, and is positioned for engagement with its associated platen upon movement of the platens to the extended position. A heating means is provided for heating the platens to a temperature sufficient to fuse the fusible surface portions when they are in contact with the platens.

A means can be provided for laterally moving the platen assembly to withdraw it from its position between the articles to be bonded. The fixture means is configured to reciprocate the thermoplastic articles toward and away from one another. This arrangement facilitates a direct fusion bonding of the articles immediately after they are heated by the platens.

The platen mounting means advantageously includes first and second longitudinally disposed carrier members on opposite sides of the central member. Each of the first and second platens is integrally mounted on its associated carrier. A first plurality of linking members are pivotally attached to the central member and first carrier member, while a second plurality of similar linking members are attached to the central member and the second carrier member. The linking members are pivotable to move the carrier members in an arcuate path relative to the central member between the extended and retracted positions.

For rapidly reciprocating the carriers, an actuator means is provided, preferably including a coil spring or other biasing means to urge the carriers into the retracted position, and a longitudinally reciprocable actuator to move the central member longitudinally against the spring force and thereby move the carriers to the extended position. The actuator can be a hydraulic piston and cylinder acting upon the central member. A pair of fixed guide rails limit longitudinal movement of a roller mounted to each carrier, to provide transverse motion of the carriers as they travel arcuately relative to the moving central member.

A particularly effective arrangement employs an elongate, rectangular standard as the central member, with each of the carriers being channels, i.e. having the profile of the letter "C", open toward the standard. The linking members are attached to the central standard and to each channel at its side walls, so that the carrier channels at least partially enclose the central standard when retracted. The links associated with each carrier traverse parallel arcuate paths which define the arcuate path of the carrier, relative to the standard, between the extended and retracted positions.

The bond forming process begins with the placement of a pair of articles to be bonded in spaced relation to one another with their fusible surfaces facing one another. The contact heating platen assembly, in the retracted position, is then positioned centrally between the articles, and spaced apart from the articles. Next, the assembly is moved to its extended configuration to position each of the platens against the fusible surface of its associated article, and the platens are heated in order to fuse the fusible surface portions. Following heating, the contact heating platens are retracted, and the retracted assembly is withdrawn from between the thermoplastic articles. The articles then are moved together so that their fused surfaces are contiguous, and maintained together under pressure while the fused surfaces cool to form the fusion bond.

A feature of the present invention resides in the fact that the platens are brought into contact with their associated heated fusible surfaces, the surfaces are heated, and the platens are withdrawn, all while the thermoplastic articles remain stationary. The relative movement between the platens and articles in this regard is entirely due to transverse movement of the platens. Thus, the carrier means for the workpieces is required to accomplish only a simple, two-stage motion: first, positioning the workpieces in their desired spaced apart relation prior to heating, then advancing the workpieces after heating to join them. Accordingly, fixtures supporting the workpieces can be of a size and strength to ensure the desired stability in aligning the workpieces with respect to one another prior to their joinder.

At the same time, the relatively lighter weight platen carriers are utilized to position the platens for heating of the articles, and later to withdraw the platens. The carriers, as compared to the articles and fixtures, can be moved with more precision and with more speed because of their lower inertia. Thus, with fewer movements required of the workpieces, and with the time critical and distance critical movements undertaken with the platens rather than the workpieces, the fusion bonding process is more repeatable, and leads to more consistent results and greater dimensional accuracy in the product created by joinder of the workpieces. The reduction in time for various motions improves the speed of the bonding process as well as the quality of the fusion bonded articles.

IN THE DRAWINGS

For a better understanding of these and other features and advantages, reference is made to the following detailed description and the drawings, in which:

FIG. 1 is a perspective view of a fusion bonding apparatus constructed in accordance with the present invention;

FIG. 2 is a perspective view similar to FIG. 1, but showing the fusion bonding apparatus extended rather than retracted;

FIG. 3 is a top plan view showing a plurality of bonding devices arranged to work in concert;

DETAILED DESCRIPTION OF THE PREFERRED EMBODIMENT

Figure 4:
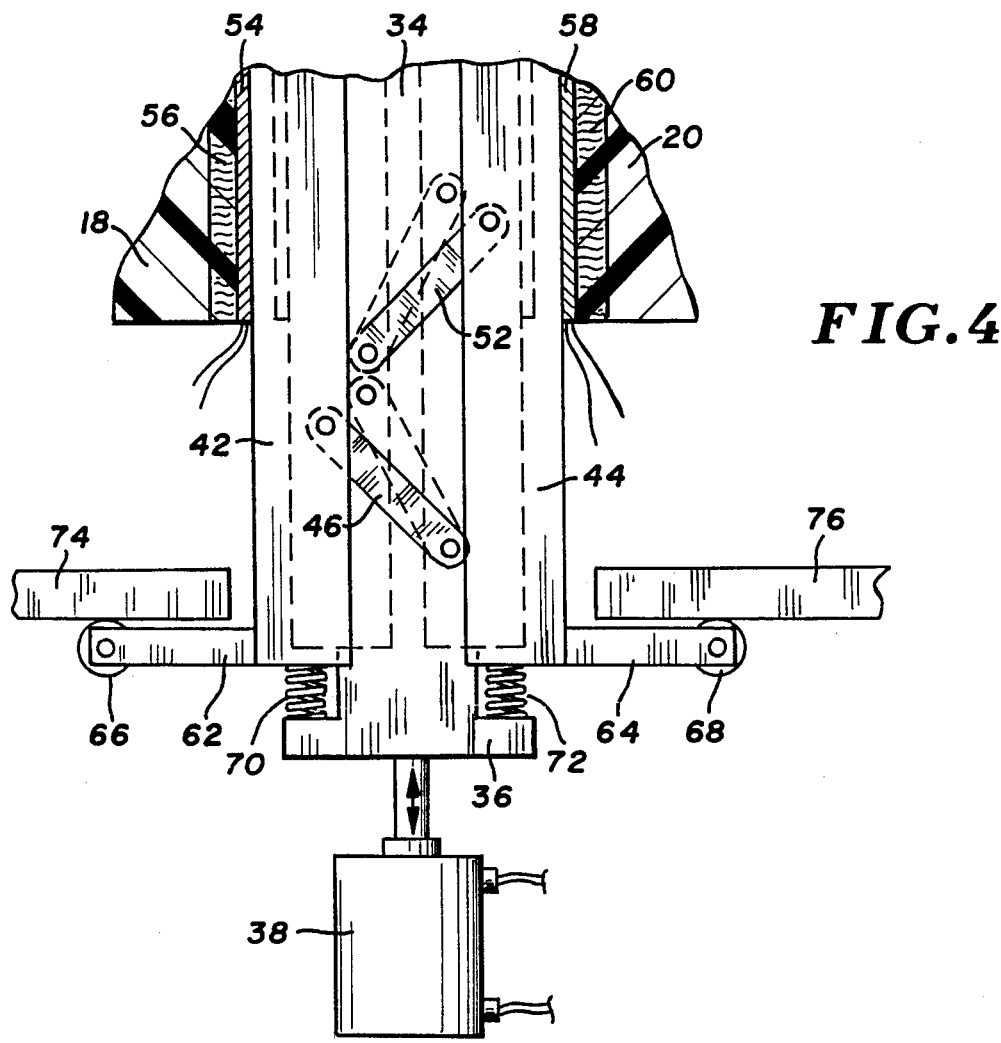
FIG. 4 is a sectional view taken along the line 4—4 in FIG. 2.

Turning now to the drawings, there is shown in FIG. 1 a contact heating platen assembly 16 interposed between a first article or workpiece 18 and a second article 20, both of a fusible material such as polystyrene or another suitable thermoplastic. An upper channel member 22 and a lower channel member 24 comprise part of a fixture that grips and supports workpiece 18, and a similar fixture for supporting workpiece 20 includes upper and lower channel members 26 and 28. These fixtures support the workpieces for linear, horizontal movement toward and away from one another, i.e. the "X" direction as indicated by the representation of mutually perpendicular X, Y and Z axes. The fixtures further can be locked or set to maintain the workpieces stationary, in a selected or predetermined spacing from one another. The specific structure of the fixtures is not further described or illustrated, as such fixtures are known in the art.

Workpieces 18 and 20 have respective fusible surface portions 30 and 32, which are arranged in opposed, facing relation to one another on opposite sides of assembly 16. In the course of fusion bonding, surface portions 30 and 32 are heated until they become fused, forming a plasticized layer along each of the workpieces. The workpieces then are joined along their plasticized layers, then allowed to cool to solidify the material and form the fusion bond.

Directing attention to FIGS. 1 and 2, heating platen assembly 16 includes an elongate, rectangular and upright standard or post 34 integrally supported on a base 36, which in turn is supported for vertical or longitudinal reciprocation by a hydraulic piston and cylinder 38. The assembly further can be reciprocable in the Y direction or perpendicular to that of workpiece movement, whereby assembly 16 can be alternatively interposed between and withdrawn from in-between the workpieces.

Mounted on opposite sides of standard 34 are first and second elongate, upright and C-shaped platen carriers 42 and 44. Six linking members 46, three of them pivotably mounted to each of the opposite sides of standard 34, are further pivotally mounted at their opposite ends to respective side walls 48 and 50 of carrier 42, whereby the platen carrier is movable in an arcuate path with respect to the central standard. Likewise, six linking members 52 are pivotably mounted to standard 34 and platen carrier 44, so that carrier 44 as well traverses an arcuate path with respect to the standard.

An electrical heating element 54 (FIG. 4) is mounted to the outwardly facing surface of carrier 42, and a contact heating platen 56 is secured integrally with respect to the carrier and over the heating element. Electrical power, when supplied to the heating element, is utilized to heat platen 56 to a temperature sufficient to fuse fusible surface portion 30 when the surface portion and platen are engaged. In similar fashion and for performing a similar function with respect to surface portion 32, an electrical heating element 58 and a contact heating platen 60 are mounted to carrier 44.

A rigid bar 62 extends horizontally outwardly of carrier 42 near its bottom, and a bar 64 likewise extends outwardly of carrier 44. Rollers, indicated respectively at 66 and 68, are rotatably mounted near the respective outer end portions of the bars. Respective coil springs at 70 and 72, under compression, provide a biasing force tending to urge the bars and base 36 away from one another.

In operation, platen carriers 42 and 44 traverse their arcuate paths simultaneously, between a retracted or collapsed position as shown in FIG. 1 with the carriers proximate standard 34, and an extended position (FIG. 2) in which carriers 42 and 44 are relatively remote from the standard in terms of horizontal or transverse distance in the X direction. As seen in FIG. 2, linking members 46 and 52 are inclined upwardly in the direction outwardly of central standard 34, such that carriers 42 and 44 travel upwardly relative to the standard toward the retracted position, and downwardly when moving toward the extended position. As seen in FIG. 1, carriers 42 and 44 when in the retracted position substantially surround the central standard. Springs 70 and 72 are under compression, and continually bias the carriers into the retracted position.

A pair of rectangular guide rails 74 and 76 are provided on opposite sides of assembly 16, for confining and guiding motion of the platens as they are extended against the force of the coil springs. More particularly, it is seen from FIG. 4 that rails 74 and 76 provide horizontal guide surfaces for rollers 66 and 68, respectively. If desired, the rails can be fixed with respect to their associated workpieces. As actuator 38 drives standard 34 upwardly, carriers 42 and 44 traverse arcuate paths with respect to the moving standard but travel horizontally with respect to the guide rails and workpieces 18 and 20. In other words, during platen extension the downward component of arcuate motion with respect to the standard is equal to the upward movement of the standard in response to actuator 38.

FIG. 3 illustrates a gang of contact heating platen assemblies 78-88 arranged in a circular pattern on a base 89, and utilized to perform multiple fusion bonds simultaneously. Each of assemblies 78-88 includes a central standard 90 and corresponding inner and outer channel-like platen carriers 92 and 94, respectively. The top ends of central standards 90 are joined with respect to one another by an annular linking member. As shown in connection with assembly 78, each of the assemblies has a pair of rollers 96 and 98, one associated with each platen carrier. An actuating means such as a piston and cylinder 99 reciprocates plate 89 vertically to move standards 90 simultaneously. A vertical guide rod 100 is also associated with each assembly.

Figure 5:
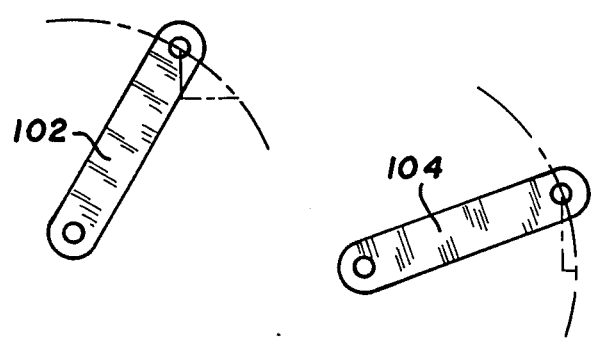
FIG. 5 is a schematic illustration showing alternative inclinations for a linking member of the apparatus.

It is to be understood that the arcuate paths traversed by the platen carriers, relative to their associated standards, are defined by the length of the linking members, or more precisely by the distance between the corresponding pivot axes of the members. In FIG. 4, linking members 46 and 52 are oriented at approximately 45° from the horizontal when the platens are extended and are somewhat more upright, perhaps 55°, when the platens are retracted. In FIG. 2, the linking members more closely approach the horizontal. The inclination of the linking members, with the platens extended, is preferably in the range of from about twenty to about forty-five degrees from the horizontal. Further, as seen from FIG. 5, the relationship between the longitudinal and transverse motion components can be determined by the orientation of the pistons. As indicated at 102, a relatively steep incline for the linking members results in a relatively large transverse (X direction) platen displacement for a given longitudinal (Z direction) displacement. Conversely, for a gradually inclined linking member as indicated at 104, the vertical component of arcuate motion is the larger component of the two. When the linking members are oriented as at 102, the speed of extending and collapsing the platens is enhanced since relatively shorter vertical motion of the standard is required. On the other hand, orienting the linking members as at 104 affords more precise control over the transverse movement of the platens.

In the course of utilizing platen assembly 16 to form a fusion bond between workpieces 18 and 20, the workpiece supporting fixtures are operated to place the workpieces in their predetermined positions for heating. In other words, fusible surface portions 30 and 32 are positioned to face one another and spaced apart a desired distance from one another, on opposite sides of platen assembly 16. The assembly in its retracted or collapsed condition is positioned centrally between the workpieces. The collapsed assembly can be positioned before the workpieces are positioned by the fixtures if desired.

Next, electrical power is supplied to heating elements 54 and 58 in order to heat platens 56 and 60 to a temperature sufficiently high for fusing surface portions 30 and 32 once they are contacted by the platens. In connection with workpieces of expanded polystyrene, an acceptable temperature is 390° F. Of course, the precise temperature will depend upon factors such as the particular fusible materials involved, the desired fusion time and desired fusion temperature.

Once the platens are sufficiently heated, standard 34 is moved upwardly, thus further compressing coil springs 70 and 72. Because of linking members 46 and 52, each of the carriers traverses an arcuate path relative to the standard. With guide rails 74 and 76 engaging their associated rollers, and the horizontal or "X" component of the arcuate motion eventually carries each of platens 56 and 60 to a surface engagement with its associated one of surface portions 30 and 32.

Platens 56 and 60 are maintained in contact with their associated surface portions for the amount of time necessary for forming a fused or plasticized layer at these surface portions. While the precise time varies with the composition and size of the workpieces as well as the temperature of the platen, the heating time in this instance is typically in the range of one to two seconds.

Following heating, actuator 38 moves standard 34 downwardly to allow platen carriers 42 and 44 to collapse under the biasing force of the springs, which occurs in a fraction of a second. Assembly 16 is withdrawn from between workpieces 18 and 20, whereupon the fixtures move the workpieces toward one another until surface portions 30 and 32 engage. The engaged workpieces are held together and the fused surface portions are allowed to cool and solidify, thereby to form a fusion bond between workpieces 18 and 20.

In contrast to conventional fusion bonding processes, the handling of workpieces 18 and 20 is a simple, two-step process: first, aligning the workpieces in a position to be contacted by the moving platens, and secondly moving the workpieces against one another following heating by the platens. The workpieces need not be advanced to a platen in order to be heated, then withdrawn slightly following heating to permit removal of the platen or platens. These steps are replaced with the extension and collapsing of platens 56 and 60 of platen assembly 16.

The advantages of using platen assembly 16 are most pronounced in connection with large, heavy or bulky workpieces, and where speed and dimensional accuracy are considered essential. Fusion bonding is accomplished with minimal handling of the workpieces, with the critical platen contact and withdrawal steps accomplished by moving the platens rather than the workpieces. Further, as these critical steps can be performed with the workpieces fixed, the bonding process has a high degree of repeatability, affording more consistent results in fusion bonds as well as improved dimensional accuracy of completed parts. The extension and retraction of platens 56 and 60, moreover, can be performed at higher speeds than an equivalent advancing and retraction of workpieces 18 and 20. Greater speed is particularly critical when the fusible materials have short melting curves, e.g. expanded polystyrene and nylon. Such materials tend to solidify relatively quickly upon removal of a heat source such as a heated platen. The retraction or collapse of platens 56 and 60 is rapid and controlled, minimizing the time necessary to accomplish the fusion bond, and creating an immediate clearance between each workpiece and its associated platen at the beginning of platen retraction. The combination of standard 34 and pivot links 46 and 52 provide a simple and reliable means for controlling the paths of the platen carriers and platens, again for a high degree of consistency over thousands of repetitions. Thus, in accordance with the present invention there is provided a means for forming more accurate, more consistent fusion bonds at a reduced time for the bonding cycle.

What is claimed is:

1. An apparatus for forming a fusion bond between a pair of thermoplastic articles, said apparatus including:
    a contact heating platen assembly including a longitudinally extended support member, a contact heating platen means disposed along the support member, and a heating platen mounting means for supporting said contact heating platen means in a longitudinal orientation and further for reciprocating said contact heating platen means between a retracted position with the platen means proximate the support member, and an extended position with the platen means relatively transversely remote from the support member;
    a workpiece carrying fixture means for supporting a pair of thermoplastic articles, each having a fusible surface portion, in transversely spaced apart relation with the respective fusible surface portions facing one another, with said contact heating platen means positioned between the workpieces in substantially centered and transversely spaced apart relation to said fusible surface portions when said platen means are in the retracted position, said platen means, when moved to the extended position while said fixture means maintains the workpieces stationary, expanding to engage said fusible surface portions; and
    a heating means for heating said platen means to a temperature sufficient to fuse said fusible surface portions when said fusible portions and platen means are engaged, said mounting means retracting said platen means once said surface portions become fused.

2. The apparatus of claim 1 wherein:
    said fixture means are reciprocable to move said workpieces toward and away from one another to permit joinder of said fusible surface portions following the heating thereof and withdrawal of the contact heating platen assembly, thereby to form a fusion bond between said thermoplastic articles.

3. The apparatus of claim 1 wherein:
    said platen means includes first and second contact heating platens on opposite sides of said support member, said mounting means includes first and second longitudinally disposed platen carrier members on opposite sides of the support member, each carrier member integrally supporting an associated one of said contact heating platens, a plurality of first linking members pivotally attached to said support member and to said first carrier member, and a plurality of second linking members pivotally attached to said support member and to said second carrier member, said first and second linking members being pivotable to move said carrier members and heating platens arcuately relative to said support member between said extended and retracted positions.

4. The apparatus of claim 3 further including:
    an actuator means acting upon said support member and carrier members to cause said arcuate movement.

5. The apparatus of claim 4 wherein:
    said actuator means includes a biasing means for urging said carrier members toward said retracted position, and a longitudinally reciprocable moving means for moving said support member longitudinally, thereby to move said carrier members toward said extended position against the force of said biasing means.

6. The apparatus of claim 5 wherein:
    said moving means includes a hydraulic piston and cylinder, one of said piston and cylinder being associated with said support member, a pair of longitudinally fixed guide rails, and a roller means mounted rotatably with respect to each carrier member and contacting an associated one of said guide rails.

7. The apparatus of claim 5 wherein:
    said longitudinal direction is vertical, and said first and second linking members are upwardly inclined from the support member to the associated one of said first and second carrier members, whereby said carrier members move downwardly relative to the support member as they move transversely away from said support member toward the extended position.

8. The apparatus of claim 7 wherein:
    said linking members are inclined at an angle in the range of from about twenty to forty-five degrees from the horizontal when the contact heating platen assembly is in the extended position.

9. A process for forming a fusion bond between a pair of thermoplastic workpieces, including the steps of:
    positioning a pair of thermoplastic workpieces, each workpiece having a fusible surface portion, in spaced apart relation with the respective fusible surface portions facing one another;
    interposing a contact heating platen means between said workpieces in substantially centered and spaced apart relation to said fusible surface portions;
    heating said platen means, and, while maintaining said workpieces stationary, expanding said platen means until said platen means engage said fusible surface portions;
    maintaining said platen means so engaged for a sufficient time to fuse said fusible surface portions;
    retracting said platen means to disengage said platen means and said fusible surface portions once said surface portions are fused, while maintaining said workpieces stationary; and
    removing said platen means from between said workpieces, advancing said workpieces toward one another until said surface portions engage, and allowing said surface portions to cool and solidify.

10. The process of claim 9 wherein:
    said heating platen means is oriented in a longitudinal direction, said workpieces are moved toward one another in a selected transverse direction, and said heating platen means expands and retracts in said transverse direction.

11. The process of claim 10 wherein:
    said platen means includes a support member, first and second contact heating platens, and means mounting said heating platens on opposite sides of said support member for traversing respective arcuate paths with respect to said support member, and wherein said extension and retraction of said platen means comprises moving said support member longitudinally and simultaneously moving said heating platens in their respective arcuate paths.

* * * * *